United States Patent [19]

Ambjerg Pedersen

[11] Patent Number: 5,641,533
[45] Date of Patent: Jun. 24, 1997

[54] NO AND LOW FAT MAYONNAISE COMPOSITIONS

[75] Inventor: Hans Christian Ambjerg Pedersen, Hockessin, Del.

[73] Assignee: Hercules Incorporated, Wilmington, Del.

[21] Appl. No.: 512,871

[22] Filed: Aug. 9, 1995

[51] Int. Cl.⁶ .................................................. A23L 1/24
[52] U.S. Cl. ........................ 426/605; 426/573; 426/577; 426/613; 426/589
[58] Field of Search ................................ 426/573, 577, 426/589, 605, 613

[56] References Cited

U.S. PATENT DOCUMENTS

| | | | |
|---|---|---|---|
| 3,367,784 | 2/1968 | Waitman et al. | 99/132 |
| 4,129,663 | 12/1978 | Jamison et al. | 426/626 |
| 5,082,684 | 1/1992 | Fung | 426/602 |
| 5,137,742 | 8/1992 | Bakal et al. | 426/589 |
| 5,260,083 | 11/1993 | Brain et al. | 426/573 |
| 5,324,531 | 6/1994 | Hoefler et al. | 426/573 |
| 5,451,420 | 9/1995 | Brain et al. | 426/523 |

FOREIGN PATENT DOCUMENTS

| | | | |
|---|---|---|---|
| 2836140 | 2/1990 | Germany. | |
| 4013765 | 10/1991 | Germany. | |
| 4042405 | 4/1993 | Germany. | |
| 149359 | 8/1949 | Japan | A23L 1/24 |
| 87741 | 5/1985 | Japan. | |
| 118162 | 6/1985 | Japan | A23L 1/24 |
| 2156649 | 10/1985 | United Kingdom | A23L 1/04 |

OTHER PUBLICATIONS

Technical Literature for G. D. Philip, entitled "Technological and Practical Aspects of Manufacture of Spice Sauces", published in Lebensmittelechniek, 1985 (17–5), pp. 222–224, 226.

Primary Examiner—Jeanette Hunter
Attorney, Agent, or Firm—David Edwards

[57] ABSTRACT

A no and low fat mayonnaise or mayonnaise like composition includes a continuous aqueous phase containing a semi-gelled system comprising a non-amidated or amidated galacturonic acid methyl ester with a degree of esterification below 55% (LM pectin) to replace part or all of the fat in order to make a mayonnaise that has organoleptic characteristics that imitates real mayonnaise.

40 Claims, No Drawings

NO AND LOW FAT MAYONNAISE COMPOSITIONS

The present invention relates to no and low fat mayonnaise compositions and the processes for preparing them.

BACKGROUND OF THE INVENTION

Today's society is becoming more health and weight conscious with a large portion of the population having a growing desire to feel and look better. One of the major ways for people to become healthier is for them to get their weight under control. Reducing the amount of calories that is consumed in a day will enable a person to lose weight and thus help that person to become a more healthier and vibrant individual. A large portion of the calories that a person consumes is associated with the amount of fat that is consumed. Hence, by a person reducing the amount of fat that is consumed in a day, he will inevitably reduce the amount of calories that are consumed, and thus lose weight and become healthier when combined with a physical fitness program. Not only will a person feel better about himself but he will improve his health by improving his cardiovascular functions. Consequently, a whole new market for no and low-fat products has emerged.

No and low fat foods are synonymous with low calories foods that have been widely advocated as a diet regimen to control excess body weight. One such food is low calorie mayonnaise.

In general, mayonnaise is an emulsified water continuous semigelled food prepared from vegetable oil(s), an acidifying ingredient of vinegar or citrus juice such as from lemon or lime, and an egg yolk containing ingredient such as liquid egg yolks, frozen egg yolks, dried egg yolks, liquid whole eggs, frozen whole eggs, dried whole eggs, or any of the above mentioned ingredients with liquid egg white or frozen egg white. Many other optional ingredients can be added to the mayonnaise as long as it does not impart to the mayonnaise a color simulating the color imparted by egg yolk. In the United States, this definition of mayonnaise is set forth by the Food and Drug Administration, HHS, Section 169.140 of 21 CFR chapter 1 (4–94 Ed.)

Mayonnaise, and mayonnaise-like dressings typically contain high amounts of fat. For example, real mayonnaise contains about 80% fat and the so called "light" mayonnaise products, marketed only in recent years, also contain about 36% fat. Most recently, an increased interest has been shown in oil-free mayonnaise-like dressing, or what is referred to in the art as spoonable dressings. In order to meet the claim of being fat-free, the products must contain less than 3.33% by weight fat or 0.5 grams of fat per tablespoon (15 grams) serving.

Notwithstanding the above, major problems are associated with the production of acceptable fat-free or low fat mayonnaise-like dressings, including the need to impart the creamy mouth feel associated with the high fat content of real mayonnaise, and the lack of opacity normally associated with those products which contain 3.33% fat or less.

U.S. Pat. No. 5,137,742 discloses an approach to making a no and low fat mayonnaise by using uncooked and ungelatinized rice starch with a particular particle size. European Patent Publication 441,495 discloses how an emulsion based on an aqueous phase containing gel forming agents like agar, gelatin, pectin, and/or carrageenan can replace a part of the normally present triglycerides in salad dressing or mayonnaise. The oil phase must contain an emulsifier.

Another approach of making low fat mayonnaise is disclosed in European Patent Publication no. 558,113 which discloses an oil-in-water spoonable emulsion with an aqueous phase containing microgels with a mean equivalent diameter of less than 100 microns. The aqueous phase is based on a gelling agent, e.g., pectin, and during the temperature setting, chemical shearing is applied to the product in order to obtain microgels.

Yet another approach of making no or low fat mayonnaise is disclosed in U.S. Pat. No. 5,324,531 which discloses a no or low oil mayonnaise using nonspheroidally shaped carbohydrate gel particles having particular size dimensions. The fat substitute is prepared by making a gel and then by means of shear, breaking the gel into well defined gel particles which will simulate emulsified products like mayonnaise, salad dressing, yoghurt and spreads.

The need still exist in the food industry for an improved fat simulating substance for making no or low fat mayonnaise that still has organoleptic characteristics that imitate real mayonnaise. The approach of the present invention is to use non-amidated or amidated galacturonic acid methyl esters with a degree of esterification below 55% (hereinafter referred to as "LMC pectin" or "LMA pectin" or collectively as "LM pectins") to replace part or all of the fat in order to make a mayonnaise that has organoleptic characteristics that imitate real mayonnaise.

SUMMARY OF THE INVENTION

The present invention is directed to a no or low fat mayonnaise or mayonnaise like composition comprising a continuous aqueous phase containing a semi-gelled system comprising at least one pectin with a degree of esterification having an upper limit of 55% and a lower limit of 5% and degree of amidation having an upper limit of 50% and a lower limit of 0 crosslinked with a polyvalent cation and a fat phase having a fat content with a lower limit of 0 and an upper limit of 60% by weight.

DETAILED DESCRIPTION OF THE INVENTION

It has been found that the use of LM pectin to replace all or a part of the fat in mayonnaise compositions makes it possible to obtain a soft, homogeneous gel which resembles a high fat mayonnaise; in this system, proteins like egg yolk, egg white, or milk proteins such as caseinate or whey protein concentrate, or other hydrocolloids, can also be replaced with the LM pectin.

In accordance with this invention, the no fat (i.e., 0 to 3.33% fat) or low fat (i.e., less than or equal to 60% fat) mayonnaise can have a fat content of from 0 to 60% with a pH in the range of 4.8 to 3.1. Mayonnaise by definition is an oil-in-water emulsion; when the oil level of the system is decreased, the viscosity also decreases. In order to counteract this loss of viscosity, stabilizers have to be used to control the water phase.

LM pectin can be used alone or in combination with other stabilizers in order to control the water phase or texture of the mayonnaise. Although it is necessary that some LM pectin be present in order to obtain the desired texture in the practice of this invention, it can be used in combination with other hydrocolloid stabilizers as will be discussed hereinafter. The stabilizers used in this invention are hydrocolloids (i.e., natural and synthetic polysaccharides) and include gelling agents (which form gels and provide viscosity) and thickeners (which only provide viscosity). In other words, hydrocolloid means all stabilizers which have gelling and/or thickening effect.

The LM pectin used in the present invention must be gelled/semi gelled in the system which is normally accomplished by the addition of a cation such as calcium. Calcium is preferred because there are several natural sources of calcium in mayonnaise systems; for example, protein and water normally contain calcium. If needed, however, calcium can be added to the mayonnaise system as a salt in order to increase the calcium level. Enough cation or calcium has to be present in the mayonnaise so that the pectin can form a gelled/semi gelled texture. If too little calcium is present, the gel formation will not take place and a very soft texture is obtained. On the other hand, if too much calcium is present, the gel formation will take place at a very high temperature so that during the cooling and mixing of the gels the texture will be broken down. This means that the final texture will be too soft for a spoonable mayonnaise. If too much calcium is present, a sequestrant is recommended in order to bind some of the calcium in order to prevent this breaking down of the texture of the mayonnaise. The level of calcium or other cation in the final system should be 10–1000 parts per million (ppm).

At least one cation must be present in the system which can be calcium or a cation. Example of the cations are calcium, iron, magnesium, zinc, potassium, sodium, aluminum, and manganese and mixtures thereof. Calcium, iron, magnesium, and zinc are preferred di and tri valent cations with calcium being the most preferred.

In accordance to this invention, the LM pectin is a special type of pectin that has a degree of esterification upper limit of 55%, preferably 45%, and most preferably 35%. The lower limit of the degree of esterification of the LM pectin is normally 5%, preferably 10%, more preferably 15%, and most preferably 20%. The degree of amidation of this LM pectin has an upper limit of 50%, preferably 40%, most preferably 25%; the lower limit of the degree of amidation is normally 0, preferably 10%, more preferably 15%.

LM pectin solution is preferably heat treated in order to insure complete hydration and also optimal utilization of the pectin. The pectin can be mixed with starch if a starch slurry is required during the production. The pectin alone or together with starch can be passed through an emulsifying unit like a colloid mill, or the pectin solution can be by passed without any shear. The pectin solution can be mixed with the other main ingredients in several different ways. Currently, production of full fat mayonnaise is taking place with or without emulsifying equipment. The primary reason for emulsification is to insure a uniform size oil droplet in the water phase. Therefore, no fat products can be produced without emulsifying equipment.

The main function of the pectin is to form a soft gel in the final product. This function does not require high shear in order to obtain the desired texture. The function of the LM pectins is to react with the cation and form a soft gel in the final product. The LM pectin can, if desired, be mixed with other stabilizers in order to control the characteristics of the LM pectin gel structure.

LM pectin can be mixed with other stabilizers such as agar-agar, carrageenan, alginate, gellan gum, xanthan gum, starch (modified or native), or other pectin types like HM-pectin (HM means high methoxyl), locust bean gum, guar gum, xanthan gum, propylene glycol alginate, microcrystalline cellulose, carboxymethylcellulose (CMC), methyl cellulose derivatives and other cellulose derivatives, gum arabic, gum ghatti, gum karaya, gum tragacant, furcellaran, curdlan, inulin, or mixtures thereof. By using LM pectin as the stabilizer, only small amounts of the LM pectin are required in order to form a homogeneous gel/semi gel in the mayonnaise. The LM pectin is versatile in the system because it can also replace proteins or other stabilizers in the formulation. Therefore, by using LM pectin in the mayonnaise, the stabilizer system is very efficient as well as improves texture, mouth feel, and taste. A small amount of LM pectin is needed in a mayonnaise to produce the desired results; the lower limit of the amount needed is about 0.05% and the upper limit is about 2% by weight.

In accordance with the present invention, the amount of water used in the composition is between about 30–95% by weight, most preferably between 55 and 80%. The amount of water present in a mayonnaise composition will depend on the manufacturer of the mayonnaise because different stabilizer systems can either raise or reduce the total amount of water in the system and yet obtain the desired organoleptic properties. An acidifying ingredient should also be present such as vinegar, in an amount of about 0.005–15% by weight, preferably about 2–10% by weight.

In the place of vinegar, either wholly or in part, it is possible to use other edible acids such as citric acid, adipic acid, phosphoric acid, acetic acid, lactic acid, ascorbic acid, fumaric acid, tartaric acid, malic acid, gluconic acid, succinic acid and the like; juices such as from lemon, lime, grapefruit, onion, and garlic can also be used. Most preferred, however, is vinegar.

The mayonnaise composition of the present invention preferably is fat free. In accordance with the FDA requirements, fat free mayonnaise can contain up to 3.33% fat and yet be classified as fat free. The low fat mayonnaise composition of the present invention can contain up to 60% fat and yet be classified as a low fat mayonnaise. The preferred upper limit of the fat phase in the present invention is 40%, more preferably 20%, and most preferably 3.33%. The lower limit of the fat phase is 0%.

In accordance with the present invention, egg yolk containing ingredients such as liquid egg yolks, liquid whole eggs, frozen whole eggs, dried whole eggs, or any one or more of the foregoing ingredients listed above with liquid egg white or frozen egg white, can be added in an amount of up to about 5% by weight, preferably up to about 3% by weight, this referring to dry weight of the ingredients.

In accordance with the present invention, appropriate seasonings to impart the mayonnaise composition distinctive flavor characteristics can be added. These ingredients are optional and are added by the manufacturer to produce the desired palate effect (taste). Salt may be included as desired in an amount of up to about 3%, preferably up to about 2%. Still further, nutritive carbohydrate sweeteners, spices or natural flavoring may also be included. Calcium disodium ethylenediamine-tetra acetate (EDTA) and/or disodium EDTA are examples of sequestrants or preservatives that may be used in the mayonnaise compositions.

The edible fat or oil used in the present invention, when desired, may be corn oil, soy bean oil, cottonseed oil, sunflower oil, rape seed oil, and the like.

In the process for making the mayonnaise composition of the present invention, the LM pectin is preferably added to the water phase together with other stabilizers, if desired. The water phase is optionally heat treated in order to insure a good solution of the gum system. The aqueous gum phase can now either be mixed with the oil phase and the acid and then be emulsified or the aqueous gum phase can be mixed with an oil plus acid phase which might be emulsified in advance.

In accordance with the present invention, LM pectin as an ingredient in the fat free or low fat mayonnaise composition of the invention provides unique properties in that it has both fat mimetic properties and the desired texture.

The texture of the final mayonnaise can be evaluated by means of a number of different methods. The following methods were used in the Examples:

Viscosity: Measure at Brookfield (RVDVII) 20° C.; Heliopath, 0.3 RPM, spindle E, Program S95.

Yield stress: Measure by Bohlin CVO. Stress sweep test, 40 mm diameter parallel plates, 1 mm gap, temperature 20° C., sweep time 100 sec., 50 steps, sweep up, starting stress 0.06 Pa, end stress 300 Pa.

Yield stress is the point where the material experiences a deformation by an increase in stress. In other words, stress below the static yield stress point will not deform the material. Stress levels above the yield stress point will deform the product G': The Elastic Modules/Element, measured by Bohlin CVO. Stress sweep test, frequency 1 Hz, 50 steps, 1 mm gap, 40 mm diameter parallel plates, temperature 20° C., starting stress 0.1 Pa, end stress 1000 Pa, equilibrium.

The elastic modules/element is the in-phase component of oscillation stress output with a given oscillatory strain input. In other words, G' expresses the gelled/elastic texture in a given material.

These properties are achieved by using the LM pectin in the preferred mayonnaise composition as follows:

0–5% of protein (e.g., whey protein concentrate, skim milk powder, butter milk powder and gelatin), 0–30% of dairy product (e.g., milk, butter milk, cultured, natural cream or cultured milk), 0.05–2% of LM pectin, 0–20% of other stabilizers (e.g., xanthan, guar gum, locus bean gum, starch, modified starch, CMC or other cellulose derivatives, carrageenan, alginates, gellan gum, HM pectin, LM pectin), 0–20% of sugar, 0–30% of carbohydrate (e.g., maltodextrin, corn syrup, sucrose, fructose, and lactose), 0–30% of seasoning (e.g., salt, spices, and monosodium glutanate), 0.005–15% of edible acid ( e.g., vinegar, adipic acid, citric acid, phosphoric acid, lactic acid, acetic acid, ascorbic acid, malic acid, succinic acid, gluconic acid, tartaric acid, fumaric acid, lemon juice, lime juice, grapefruit juice, onion juice, and garlic juice, and mixture thereof), 0–60% of oil or fat, 0.001–1% of calcium or magnesium salts (e.g., calcium chloride, calcium acetate, monocalcium phosphate, calcium lactate, calcium gluconate, calcium sulfate, calcium citrate, calcium tartrate, dicalcium phosphate, tricalcium phosphate, calcium carbonate), 0–20% of flavors, and 0–20% of colors.

The following examples are provided to further illustrate the present invention. The scope of the invention is not, however, meant to be limited to the specific details of these examples. All percentages are based on weight unless otherwise stated. In each of the following Examples, the LMA pectin has a DE of approximately 30% and a DA of approximately 20%.

EXAMPLE 1

| FAT FREE MAYONNAISE | | | |
|---|---|---|---|
| | Ingredients (wt. %) | I | II |
| A | Starch (465)* | 4.5 | 4.5 |
| A | Water add up to 100% | | |
| A | LMA-pectin | | 0.6 |
| B | Sugar | 4 | 4 |
| B | Salt | 1.2 | 1.2 |
| B | Mustard | 0.5 | 0.5 |
| B | Sodium Benzoate | 0.1 | 0.1 |
| B | CaHPO$_4$ | — | 0.03 |
| C | Vinegar | 10 | 10 |
| | Viscosity (1000 cps, 0.3 rpm) | 300 ± 40 | 750 ± 50 |
| | G' (Pa) | 200 | 780 |
| | Yield Stress | 15 | 75 |

*Marketed by National Starch

Procedure 1.

The dry starch and LMA-pectin were mixed together in a vessel and then added to the water, followed by heating to 80°–90° C. Then the aqueous solution was cooled to 15°–20° C. The part B ingredients were then mixed together and added to the aqueous solution. Vinegar was added and then mixed by means of a colloid mill to form the semi-gelled mayonnaise product. The texture of this product was then evaluated.

EXAMPLE 2

| FAT FREE MAYONNAISE | | | |
|---|---|---|---|
| | Ingredients (wt. %) | III | IV |
| A | Starch (465)* | 4.5 | 4.5 |
| A | Water add up to 100% | | |
| A | LMA-pectin | | 0.5 |
| A | Sugar | 4 | 4 |
| A | Xanthan** | 0.3 | 0.3 |
| B | CaCl$_2$ | | 0.03 |
| B | Salt | 1.2 | 1.2 |
| B | Mustard | 0.5 | 0.5 |
| B | Sodium Benzoate | 0.1 | 0.1 |
| B | Water | 5 | 5 |
| B | Vinegar | 10 | 10 |
| B | Oil | 1.6 | 1.6 |
| | Viscosity (1000 cps, 0.3 rpm) | 300 ± 40 | 800 ± 50 |
| | G' (Pa) | 200 | 830 |
| | Yield Stress | 20 | 79 |

*Marketed by National Starch
**Marketed by Kelco

Procedure 2.

The dry ingredients of pectin, xanthan, starch and sugar were mixed together in a container. This dry mix was then added to water (Part A) and heated to 80°–90° C. Part B ingredients were mixed together with shear, and then added to part A. The product was then mixed by means of a colloid mill. The product was then placed into suitable packaging and the texture of the product was evaluated using the test procedure discussed above.

EXAMPLE 3

FAT FREE MAYONNAISE

| | Ingredients (wt. %) | V | VI |
|---|---|---|---|
| A | Starch (465)* | 4.5 | 4.5 |
| A | LMA-pectin | | 0.5 |
| A | Sugar | 4 | 4 |
| A | Xanthan** | 0.3 | 0.3 |
| A | CaCl$_2$ | | 0.03 |
| A | Salt | 1.2 | 1.2 |
| A | Mustard | 0.5 | 0.5 |
| A | Sodium Benzoate | 0.1 | 0.1 |
| A | Water | 5 | 5 |
| A | Vinegar | 10 | 10 |
| | Viscosity (1000 cps) | 300 ± 40 | 800± 50 |
| | G' (Pa) | 210 | 840 |
| | Yield Stress (Pa) | 17 | 81 |

*Marketed by National Starch
**Marketed by Kelco

Procedure 3.

All of the ingredients were mixed together in a vessel and heated to 80°–90° C. for 2–5 minutes. The product was then cooled to approximately 40° C. and filled into suitable packaging. The viscosity, elastic modules G' and yield stress were then measured on the final mayonnaise product.

EXAMPLE 4

LOW FAT MAYONNAISE

| | Ingredients (wt. %) | VII | VIII |
|---|---|---|---|
| A | Starch (465)* | 4.5 | 4.5 |
| A | Water add up to 100% | | |
| A | LMA-pectin | | 0.5 |
| A | Sugar | 4 | 4 |
| A | Xanthan** | 0.3 | 0.3 |
| B | CaCl$_2$ | | 0.03 |
| B | Salt | 1.2 | 1.2 |
| B | Mustard | 0.5 | 0.5 |
| B | Sodium Benzoate | 0.1 | 0.1 |
| B | Water | 5 | 5 |
| B | Vinegar | 10 | 10 |
| B | Oil | 7 | 7 |
| | Viscosity (1000 cps, 0.3 rpm) | 430 ± 40 | 900 ± 60 |
| | G' (Pa) | 230 | 1010 |
| | Yield Stress (Pa) | 19 | 89 |

*Marketed by National Starch
**Marketed by Kelco

Procedure 4. The dry ingredients (A) of pectin, xanthan, starch and sugar were mixed together in a container. This dry mix was then added to water (Part A) and heated to 80°–90° C. Part B ingredients were mixed separately in a mixer with high shear. The premixed ingredients of Part B were then mixed with Part A. The product was then filled into suitable packaging and the texture of the final mayonnaise was determined by the methods set forth above.

EXAMPLE 5

LOW FAT MAYONNAISE

| | Ingredients (wt. %) | IX | X |
|---|---|---|---|
| A | Starch (465)* | 3.5 | 3.5 |
| A | Water add up to 100% | | |
| A | LMA-pectin | | 0.6 |
| A | Sugar | 4.5 | 4.5 |
| B | CaCl$_2$ | | 0.025 |
| B | Sodium Benzoate | 0.1 | 0.1 |
| B | Water | 20 | 20 |
| B | Vinegar | 10 | 10 |
| B | Oil | 20 | 20 |
| B | Xanthan | 0.3 | 0.3 |
| C | Salt | 1.2 | 1.2 |
| | Viscosity (1000 cps, 0.3 rpm) | 380 | 380 |

*Marketed by National Starch
**Marketed by Kelco

Procedure 5. The dry ingredients (A) of pectin, starch and sugar were mixed together in a container. This dry mix was then added to water (Part A) and heated to 80°–90° C. Part A can be cooled if desired. Part B ingredients were mixed together and then Part C was added. The combined Part B and C were then emulsified by means of a colloid mill and then added to Part A. The product was then filled into suitable packaging and the texture of the final mayonnaise was determined by the methods set forth above.

EXAMPLE 6

LOW FAT MAYONNAISE

| | Ingredients (wt. %) | XI |
|---|---|---|
| A | Starch (465)* | 2.5 |
| A | Water add up to 100% | |
| A | LMA-pectin | 0.5 |
| A | Sugar | 2 |
| B | CaCl$_2$ | 0.02 |
| B | Sodium Benzoate | 0.1 |
| B | Water | 30 |
| B | Vinegar | 10 |
| B | Oil | 35 |
| B | Xanthan | 0.3 |
| C | Salt | 1.2 |
| | Viscosity (1000 cps) | 833 |

*Marketed by National Starch
**Marketed by Kelco

Procedure 6. The dry ingredients of pectin, starch and sugar were mixed together in a vessel. This dry mix was then added to water (Part A) and heated to 80°–90° C. Part B ingredients were mixed together and then Part C was added. The combined Part B and C were emulsified by means of a colloid mill and then added to Part A. The product was then filled into suitable packaging and evaluated.

What is claimed:

1. A no and low fat mayonnaise or mayonnaise like composition comprising a continuous aqueous phase containing a semi-gelled system comprising at least one low methoxyl pectin with a degree of esterification having an upper limit of 55% and a lower limit of 5% and degree of amidation having an upper limit of 50% and a lower limit of 0% crosslinked with a cation and a fat phase having a fat content with a lower limit of 0 and an upper limit of 60% by weight.

2. The composition of claim 1 wherein the upper limit of the degree of esterification is 45%.

3. The composition of claim 1 wherein the upper limit of the degree of esterification is 35%.

4. The composition of claim 1 wherein the lower limit of the degree of esterification is 10%.

5. The composition of claim 1 wherein the lower limit of the degree of esterification is 15%.

6. The composition of claim 1 wherein the lower limit of the degree of esterification is 20%.

7. The composition of claim 1 wherein the upper limit of the degree of amidation is 40%.

8. The composition of claim 1 wherein the upper limit of the degree of amidation is 25%.

9. The composition of claim 1 wherein the lower limit of the degree of amidation is 10%.

10. The composition of claim 1 wherein the lower limit of the degree of amidation is 15%.

11. The composition of claim 1 wherein the upper limit of the fat phase is 40%.

12. The composition of claim 1 wherein the upper limit of the fat phase is 20%.

13. The composition of claim 1 wherein the upper limit of the fat phase is 3.33%.

14. The composition of claim 1 wherein the lower limit of the fat phase is 0%.

15. The composition of claim 1 wherein at least one other hydrocolloid is present.

16. The composition of claim 1 wherein the cation is a mono-, di-, or tri-valent cation.

17. The composition of claim 16 wherein the cation is selected from the group consisting of calcium, iron, magnesium, zinc, potassium, sodium, aluminum, manganese, and mixtures thereof.

18. The composition of claim 17 wherein the cation is selected from the group consisting of calcium, iron, magnesium, and zinc.

19. The composition of claim 18 wherein the cation is calcium.

20. The composition of claim 1 wherein an edible acid is present.

21. The composition of claim 20 wherein an edible acid is selected from the group consisting of vinegar, adipic acid, citric acid, phosphoric acid, lactic acid, acetic acid, ascorbic acid, malic acid, succinic acid, gluconic acid, tartaric acid, fumaric acid, lemon juice, lime juice, grapefruit juice, onion juice, garlic juice, and mixture thereof).

22. The composition of claim 21 where the pH of the composition is 3.1 to 4.8.

23. The composition of claim 1 where the water content has an upper limit of 95% by weight of the composition.

24. The composition of claim 1 wherein egg yolk and/or egg white is present.

25. The composition of claim 24 wherein the egg yolk and/or egg white content is from about 0.1 to about 15% by weight of the composition.

26. The composition of claim 1 wherein protein is present.

27. The composition of claim 26 wherein the protein is selected from the group consisting of whey protein concentrate, skim milk powder, butter milk powder and gelatin.

28. The composition of claim 1 wherein appropriate seasonings and flavors are present to impart to said composition distinctive flavor characteristics.

29. The composition of claim 28 wherein the seasonings are selected from at least one of sugar, salt, spice, and monosodium glutamate.

30. The composition of claim 1 wherein a carbohydrate is present.

31. The composition of claim 29 wherein the carbohydrate is selected from maltodextrin, corn syrup, sucrose, fructose, or lactose.

32. The composition of claim 15 wherein at least one other hydrocolloid is selected from the group consisting of agar, alginate, propylene glycol, alginate, high methoxyl pectin, carrageenan, gellan gum, starch, modified starch, xanthan gum, locust bean gum, guar gum, microcrystalline cellulose, carboxymethyl cellulose, methyl cellulose derivatives, karaya gum, ghatti gum, gum tragacanth, furcellaran, curdlan, and inulin.

33. The composition of claim 1 wherein a dairy product is present.

34. The composition of claim 32 wherein the dairy product is selected from milk, buttermilk, cultured cream, natural cream, or cultured milk.

35. The composition of claim 1 wherein appropriate colors are present.

36. The composition of claim 1 wherein at least one ingredient is present selected from the group consisting of protein, other stabilizer, seasoning, carbohydrate, dairy products, edible acid, coloring, flavoring, and oil.

37. The composition of claim 1 wherein the degree of esterification is about 30% and the degree of amidation is about 20% and the upper limit for the amount of LMA pectin present is 2%.

38. The composition of claim 37 wherein the upper limit of the amount of LMA pectin present is 1%.

39. The composition of claim 37 wherein the amount of LMA pectin present is 0.4%.

40. The composition of claim 37 wherein the lower limit of the amount of LMA pectin present is 0.05%.

* * * * *